United States Patent
Bertholee

(10) Patent No.: US 9,168,816 B2
(45) Date of Patent: Oct. 27, 2015

(54) OPEN ROOF CONSTRUCTION FOR A VEHICLE

(71) Applicant: Inalfa Roof Systems Group B.V., Venray (NL)

(72) Inventor: Jean Marie Victor Bertholee, Ortonville, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/447,269

(22) Filed: Jul. 30, 2014

(65) Prior Publication Data

US 2015/0069795 A1    Mar. 12, 2015

Related U.S. Application Data

(63) Continuation-in-part of application No. 14/024,296, filed on Sep. 11, 2013, now abandoned.

(51) Int. Cl.
*B60J 7/22* (2006.01)

(52) U.S. Cl.
CPC ........................................ *B60J 7/22* (2013.01)

(58) Field of Classification Search
CPC ........................................................ B60J 7/22
USPC ........................................................ 296/217
See application file for complete search history.

(56) References Cited

U.S. PATENT DOCUMENTS

| | | | |
|---|---|---|---|
| 6,669,277 B2 * | 12/2003 | Farber et al. | 296/217 |
| 6,705,673 B1 | 3/2004 | Sorensen | |
| 6,817,659 B2 | 11/2004 | Vogel | |
| 2003/0038512 A1 | 2/2003 | Farber | |
| 2005/0242629 A1 | 11/2005 | Raasakka | |
| 2013/0175830 A1 | 7/2013 | Boywitt | |

FOREIGN PATENT DOCUMENTS

| | | | |
|---|---|---|---|
| DE | 10137363 | 11/2002 | |
| GB | 2497637 | 6/2013 | |
| JP | 2008137502 | * 6/2006 | ............. B60J 7/22 |

OTHER PUBLICATIONS

Non-final Office Action for U.S. Appl. No. 14/024,296, filed Sep. 11, 2013, mailed Aug. 15, 2014.
Notice of Allowance and Fee(s) Due for U.S. Appl. No. 14/024,296, filed Sep. 11, 2013, mailed Jan. 20, 2015.
International Search Report from corresponding foreign application EP 14179897, date of search Jan. 20, 2015.

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a roof opening provided in a stationary roof part, a movable panel for opening and closing said roof opening and a wind deflector assembly proximate a forward edge of the roof opening. The wind deflector assembly comprises a frame part extending substantially in a transverse direction and movable between a retracted position and extended position below and above, respectively, the level of the stationary roof part and a flexible member attached to said frame part at a first end and attached to a stationary part of the vehicle at a second end. The wind deflector assembly further comprises a guide rod for the flexible member extending in a transverse direction and movable in a longitudinal direction of the vehicle. The guide rod is moves so that the flexible member is maintained in a taut state in all positions of the frame part.

25 Claims, 8 Drawing Sheets

OPEN ROOF CONSTRUCTION FOR A VEHICLE

CROSS-REFERENCE TO RELATED APPLICATION

The present application is a continuation-in-part of and claims priority of U.S. patent application Ser. No. 14/024,296, filed Sep. 11, 2013, the content of which is hereby incorporated by reference in its entirety.

BACKGROUND

The discussion below is merely provided for general background information and is not intended to be used as an aid in determining the scope of the claimed subject matter.

Aspects of the invention relate to an open roof construction for a vehicle, comprising a roof opening provided in a stationary roof part, a movable panel for opening and closing said roof opening and a wind deflector assembly positioned near a forward edge of the roof opening, which wind deflector assembly comprises a frame part extending substantially in a transverse direction and movable between a retracted position below the level of the stationary roof part and an extended position above said level of the stationary roof part and a flexible member which with a first end is attached to said frame part and which with an opposite second end is attached to a stationary part of the vehicle.

For obtaining the best performance and appearance of the wind deflector the flexible member (which often comprises a mesh material) should be kept taut in at least all positions of the frame part above the level of the stationary roof part.

SUMMARY

This Summary and the Abstract are provided to introduce a selection of concepts in a simplified form that are further described below in the Detailed Description. This Summary, the Abstract and the Detailed Description are not intended to identify key features or essential features that must be included in any embodiment of the invention, nor are they intended to be used as an aid in determining the scope of the claimed subject matter.

In one embodiment, an open roof construction is provided in which the wind deflector assembly further comprises a guide rod for the flexible member extending in a transverse direction and movable in a longitudinal direction of the vehicle, wherein the flexible member, starting from its second end, successively extends in a first sense substantially along said longitudinal direction towards the guide rod, partially around said guide rod and in an opposite sense substantially along said longitudinal direction, next passes a stationary guide there for and from there extends towards the frame part, and wherein the guide rod is movable in such a manner that the flexible member is maintained in a taut state in all positions of the frame part.

Through its movements the guide rod always assumes a position in which the flexible member is kept taut. When the frame part of the wind deflector assembly moves upward (further away from the stationary roof part) the guide rod will move closer to the said stationary part of the vehicle to which the second end of the flexible member is attached. When, however, the frame part of the wind deflector assembly moves downward (closer to the stationary roof part) the guide rod will move away from the said stationary part of the vehicle to which the second end of the flexible member is attached. Because of the loop-shaped trajectory of the flexible member (in a first sense substantially along said longitudinal direction towards the guide rod, partially around said guide rod and in an opposite sense substantially along said longitudinal direction) the distance over which the guide rod will move, only is half the distance over which the frame part will travel. As a result, the required space for accommodating the movements of the guide rod is limited.

It is noted that the effect of obtaining a reduction of the required space for accommodating the movements of the guide rod also will be obtained (although in a slightly reduced magnitude) when the trajectory of the flexible member in the first sense and/or the second sense does not exactly coincide with the said longitudinal direction; such embodiments, however, are considered to be encompassed by the present disclosure as well.

Further it is noted that the stationary guide will guide the flexible member in positions between the extended and retracted positions of the frame part. Whether it does so too in the extended and retracted positions, will depend from the specific constructional features.

It is conceivable that said first sense corresponds with a forward direction with respect to the vehicle. This results in a forward movement (with respect to the vehicle) of the guide rod when the frame part moves towards its retracted position.

In one embodiment of the open roof construction according to the invention, the guide rod is biased in said first sense substantially along the longitudinal direction. This means that the movement of the frame part and the resulting movement of the flexible member automatically will lead to a movement of the guide rod without the need for a separate drive for the guide rod. When, as will be the case in many embodiments, the frame part is also biased to its extended position (for example because it is carried by two pivot arms which are spring loaded), the flexible member is tensioned by two biasing means.

For example, it is possible that the guide rod is engaged by a spring (for example, compression springs or tension springs) extending between said guide rod and a stationary part of the vehicle.

For obtaining a smooth movement of the guide rod, in one embodiment it comprises two opposite ends which are guided in two corresponding stationary guide channels each extending substantially in the longitudinal direction. For achieving a guiding with as less friction as possible, the said outer ends of the guide rod and the corresponding guide channels may comprise cooperating parts made of low friction material, as is known per se.

In another embodiment of the open roof construction, the frame part of the wind deflector assembly is biased towards its extended position and at least part of its momentary positions are defined by an engagement with the movable panel, and wherein further a first drive mechanism for the movable panel is provided as well as a second drive mechanism for the guide rod for determining its longitudinal position, wherein the first and second drive mechanism are synchronised to keep the flexible member in a taut state.

In such an embodiment, the position of the wind deflector depends from the position of the movable panel. The frame part by its bias is pressed against the panel and only can move towards its extended position when the panel is moved by its first drive mechanism: the more the panel moves towards its open position, the more the frame part will move towards its extended position. Generally, but not necessarily, the frame part already will reach its fully extended position before the panel is fully opened. Again moving the panel towards the closed position will also move the frame part to its retracted position. Thus, the movement of the frame part (and, consequently of the flexible member) has a well-defined relation to the movement of the movable panel and this known relation may be used to control (synchronise) the second drive mechanism for moving the guide rod such that the flexible member always is kept taut.

The manner in which the synchronization between the first and second drive mechanism is obtained may vary. For example mechanical and/or electronic devices may be used for that goal. Mechanical devices generally define a purely mechanical connection between the drives using any kind of appropriate parts (gears, belts or alike), whereas electronic devices may rely on, for example, sensors sensing the position of the movable panel and a controller for, based upon the sensed position, calculating a position for the guide rod and thus a control signal for the second drive mechanism.

In yet another embodiment of the open roof construction the frame part of the wind deflector assembly is biased towards its open position and the guide rod is provided with a drive mechanism for defining its longitudinal position. In such an embodiment the position of the frame part is not defined by the position of the movable panel, but by the position of the (driven) guide rod. A movement of the guide rod will cause a movement of the frame part (in correspondence with its bias or opposite said bias, depending on the direction in which the guide rod moves under influence of its drive mechanism).

The stationary guide may be defined by a forward inner edge of the roof opening, for example a lower inner end of a constructive beam defining the forward edge of the roof opening.

For minimizing frictional forces and wear of the flexible member, the stationary guide may be defined by a rotatable guide roll having a stationary axis of rotation.

It is also conceivable that the stationary guide is defined by a plate shaped member positioned underneath a forward inner edge of the roof opening having a rounded edge facing the roof opening for guiding the flexible member. Such a plate shaped member may be attached to any appropriate stationary part of the open roof construction or of the vehicle.

Then, it is further possible that such a plate shaped member is shaped as water collecting gutter for collecting water entering the roof opening when the movable panel is in a position for opening the roof opening. The water collected by it may be directed to a water discharge member positioned there below and already present, as known in the state of the art.

In correspondence with what has been stated before with respect to the stationary guide, it is conceivable too that the guide rod is defined by a rotatable guide roll.

Constructively the open roof construction according to an aspect of the present disclosure may comprise a forward edge defined by a transverse hollow beam and wherein the guide rod is housed in said hollow beam. Because, as stated before, the required space for the movement of the guide rod is limited, the dimensions of such a hollow beam also may be limited.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
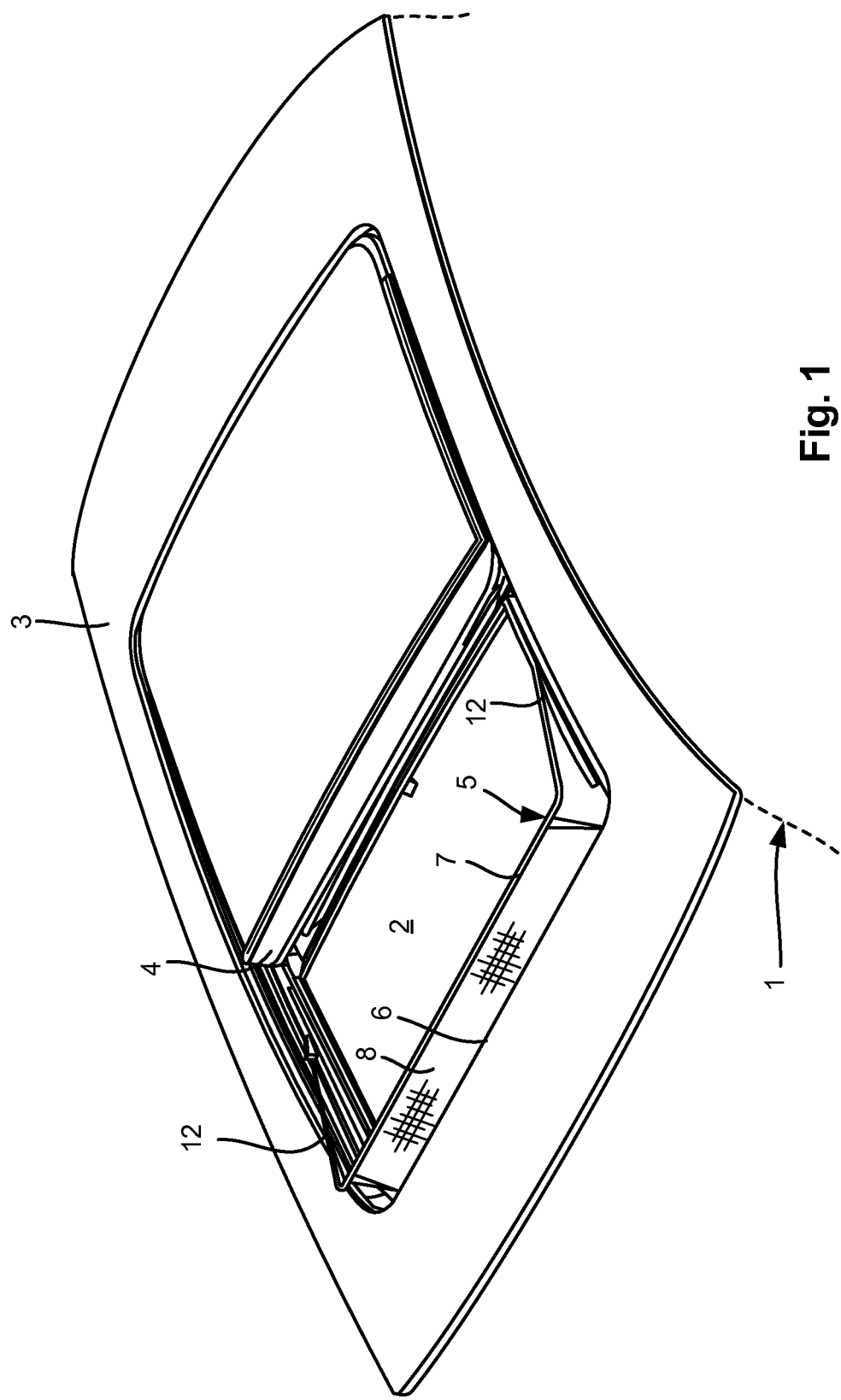
FIG. 1 schematically illustrates part of a vehicle provided with an open roof construction in a perspective view.

Firstly referring to FIG. 1, part of a vehicle 1 is shown schematically and in a perspective view. The vehicle 1 is provided with an open roof construction, comprising a roof opening 2 provided in a stationary roof part 3, a roof assembly including a movable panel 4 for opening and closing said roof opening and a wind deflector assembly 5 positioned near a forward edge 6 of the roof opening. As generally known, said wind deflector assembly 5 comprises a frame part 7 extending substantially in a transverse direction (relative to the forward direction of travel of the vehicle 1).

As illustrated clearly in FIGS. 2 and 3 said frame part 7 is movable between a retracted position below the level of the stationary roof part 3 (position according to FIG. 2) and an extended position above said level of the stationary roof part 3 (position according to FIG. 3), in the present case through pivot arms 12 (FIG. 1). In most cases such pivot arms 12 will be spring loaded for moving the frame part 7 to its extended position, although also other ways are conceivable for obtaining a movement of the pivot arms 12 (for example cooperating pins and curves moving relative to each other).

The wind deflector assembly 5 further comprises a flexible member 8 (most commonly a mesh member) which with a first end 8" is attached to said frame part 7 and which with an opposite second end 8' is attached to a stationary part 10 of the vehicle (as will appear below from FIG. 2).

Figure 2:
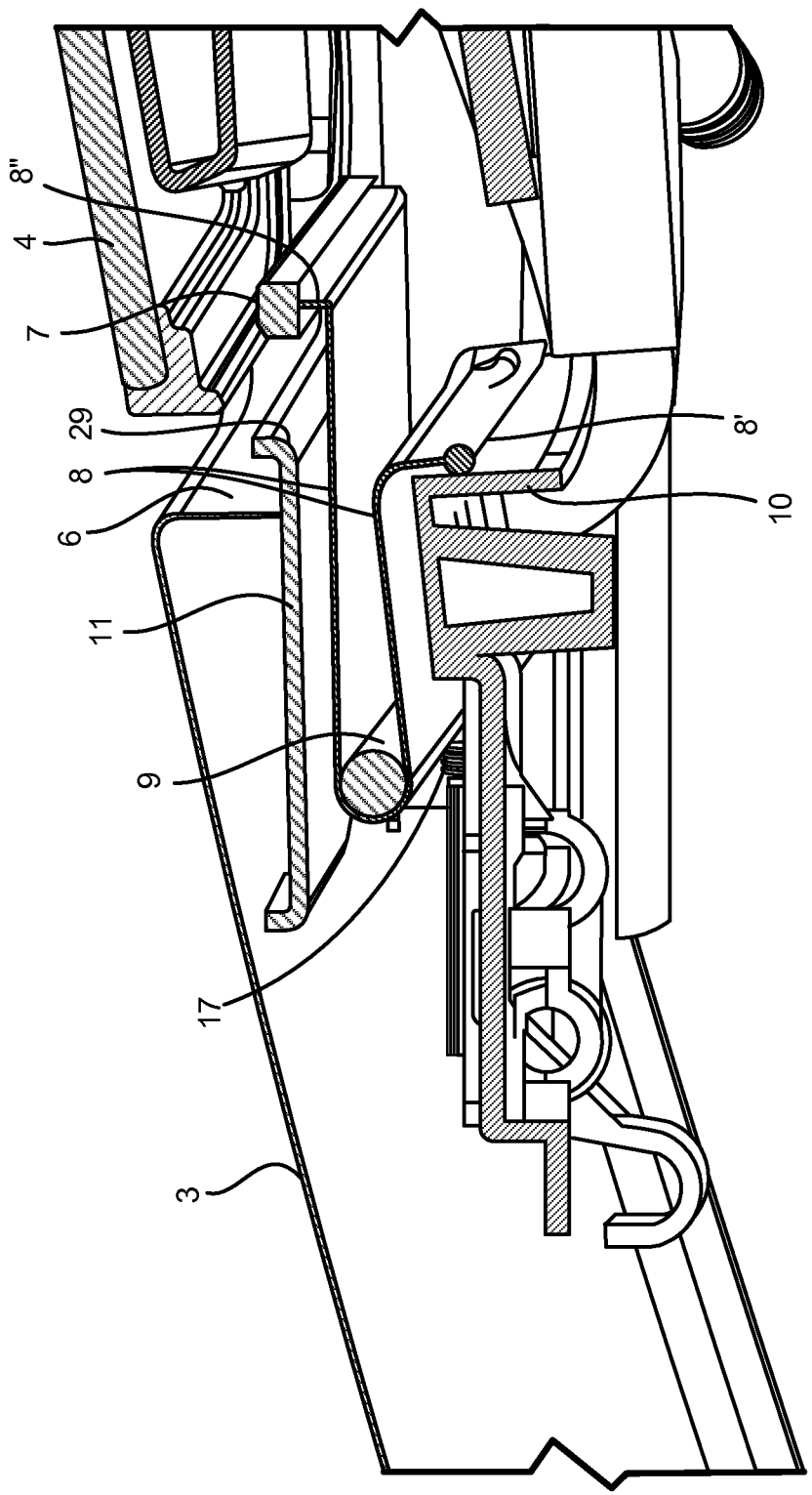
FIG. 2 illustrates an embodiment of the open roof construction in a closed position.

FIG. 2 shows the basic components of a wind deflector assembly 5 according to an embodiment of the present disclosure in a perspective view. Apart from the frame part 7 already mentioned before, the wind deflector assembly 5 further comprises a guide rod 9 extending in a transverse direction and movable in a longitudinal direction of the vehicle 1 (that means in FIG. 2 basically horizontally to the left and to the right). The guide rod 9 is positioned such that the flexible member 8, starting from its second end 8' (which is connected to said stationary part 10 of the vehicle), successively extends mainly in a first sense (in FIG. 2 to the left, thus in this embodiment in the forward direction with respect to the vehicle 1; of course, as illustrated, an extreme end near to said second end 8' may have a different orientation due to specific attachment requirements to the stationary part 10) substantially along said longitudinal direction towards the guide rod 9, partially around said guide rod 9 and in an opposite sense (in FIG. 2 to the right) substantially along said longitudinal direction, next passes a stationary guide 11 and from there extends towards the frame part 7 (to which the flexible member 8 is attached with its first end 8").

Figure 3:
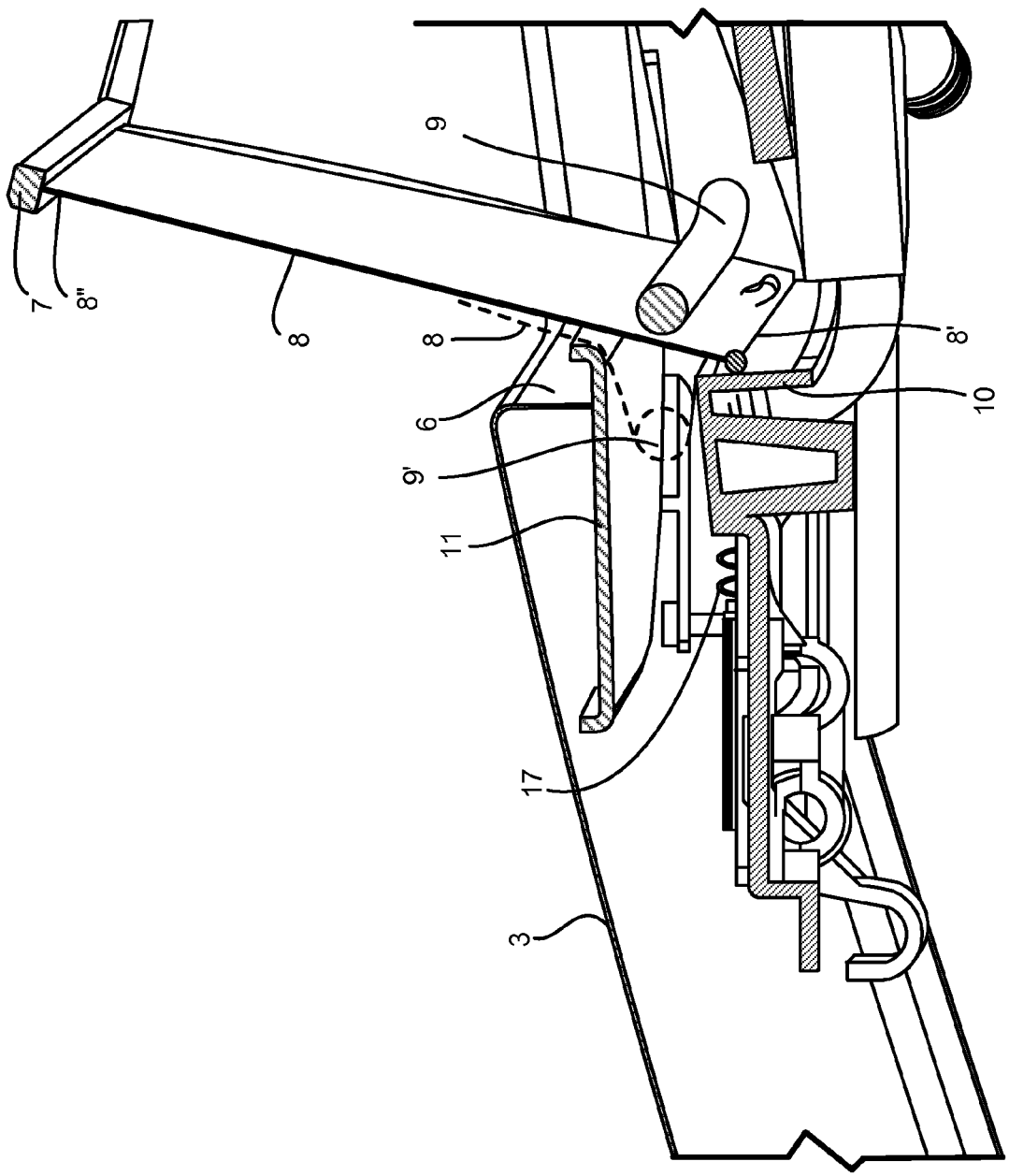
FIG. 3 illustrates the open roof construction in a (fully or partly) open position.

The guide rod 9 is movable (basically in said longitudinal direction of the vehicle 1) in such a manner that the flexible member 8 is maintained in a taut state in all positions of the frame part 7 (as illustrated in different positions according to FIGS. 2 and 3).

In FIG. 2 the movable panel 4 is fully closed and the frame part 7 is in a fully retracted position. The guide rod 9 assumes it leftmost position. In the illustrated embodiment, the flexible member 8 does not engage the stationary guide 11 in this retracted position of the frame part. In other embodiments (in which, for example, the frame part 7 in its fully retracted position assumes a slightly higher position) it might do so, however. In this embodiment, however, the second end 8' of the flexible member extends around a corner of the stationary part 10, which corner for that reason might have a rounded contour (not illustrated).

In FIG. 3 the roof opening 2 is (completely or partly) open and the frame part 7 has assumed its upper, totally extended position. The guide rod 9, consequently, has reached its extreme right (rearward) position. Also in this position the flexible member 8, depending on the constructional specifics, may or may not engage the stationary guide 11.

In intermediate positions, when the movable panel 4 has moved (to the rear) to a position for partly freeing the roof opening 2 and the frame part 7 is partly extended, the guide rod 9, starting from the FIG. 2 position, has moved partly to the right (position 9' in FIG. 3). The distance the guide rod 9 has traveled basically is half the distance the frame part 7 has moved. As illustrated in dashed lines, the flexible member 8 then engages the stationary guide 11 and is guided thereby since the flexible member 8 is kept taut from edge 8' to edge 8".

In at least some of the intermediate positions as illustrated in FIG. 3, the flexible member 8 from the guide rod 9 to the frame part 7 can extend at an oblique angle to the longitudinal direction, and wherein the oblique angle is different for different positions of the guide rod. In yet a further embodiment due to contact of the flexible member 8 with the stationary guide 11, the flexible member extends at a first oblique angle to the longitudinal direction from the guide rod 9 to the stationary guide 11 and at a second oblique angle, different than the first oblique angle, from the stationary guide 11 to the frame part 7, the angles again being different for different positions of the guide rod 9.

However, it should be noted in yet another embodiment the diameter of the guide rod 9 can be substantially the same as the height from the stationary part 10 to the guide 11, in which case, an oblique angle formed in the flexible member from the guide rod 9 to the frame part 7 resides in the portion from the guide 11 to the frame part 7 for at least some intermediate positions of the frame part 7.

As is known from the state of the art, the frame part 7 at both its transverse ends is connected to pivot arms 12 (see for example the schematic illustration of FIG. 5) carrying at one end the frame part 7 and with the other end being pivoted 13 to the vehicle 1. In favorable embodiments, spring members 14 bias the pivot arms 12 towards the fully extended position of FIG. 3. One other possible embodiment could comprise a frame part 7 which does not rotate but which basically moves in a translating manner.

Figure 4:
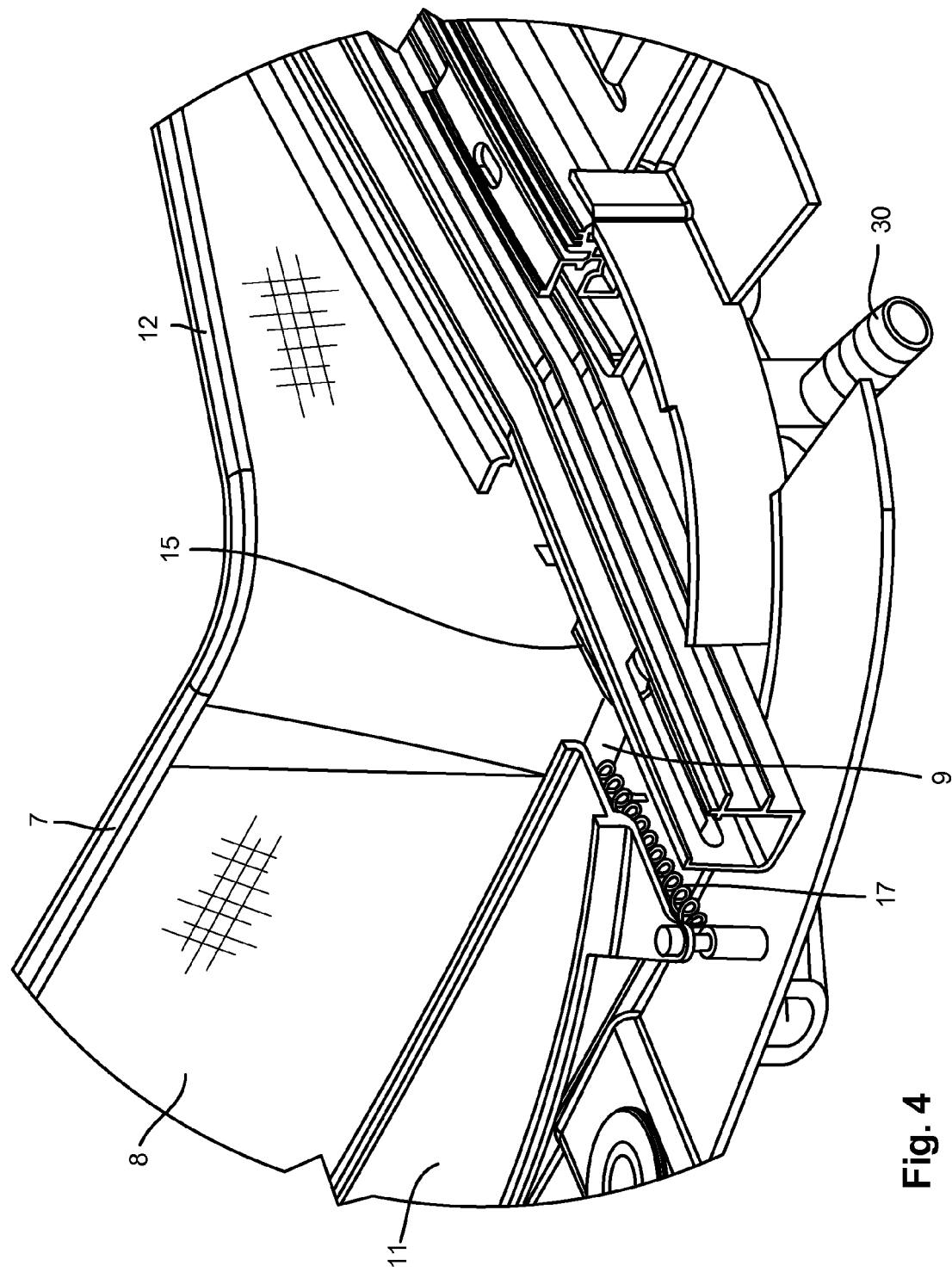
FIG. 4 shows another perspective view of said embodiment illustrating further details.
Figure 8:
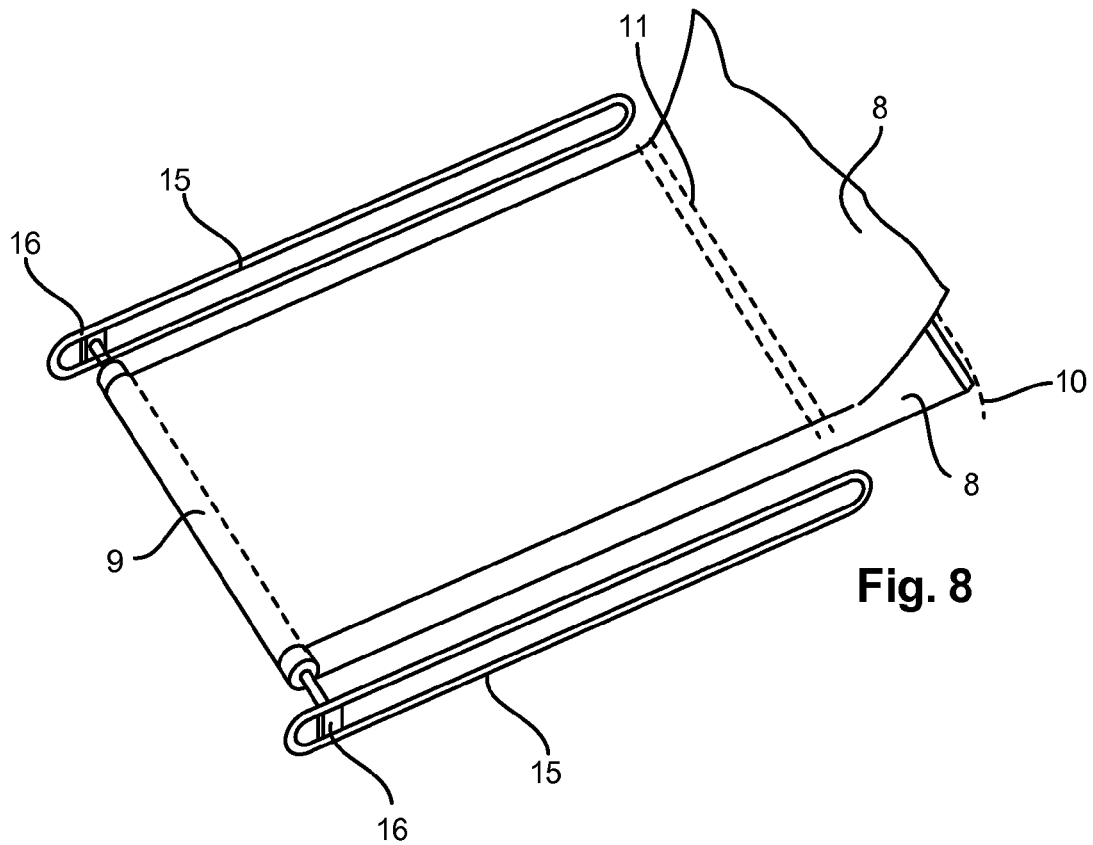
FIG. 8 schematically shows the guiding of the guide rod.

FIG. 4 further schematically illustrates one of two stationary guide channels 15 for the opposite ends of the guide rod 9 each extending substantially in the longitudinal direction. As better illustrated schematically in FIG. 8, said guide channels 15 may cooperate with guide shoes 16 or alike provided at opposite ends of the guide rod 9 for defining the trajectory along which the guide rod 9 will move. It is noted however, that the movement of the guide rod 9 also may be defined by other means, such as for example by drives as elucidated below.

FIGS. 2-4 illustrate an embodiment of the open roof construction in which the guide rod 9 is biased in said first sense substantially along the longitudinal direction, by being engaged by a spring device 17 extending between said guide rod 9 and a stationary part of the vehicle 1.

In the embodiment illustrated in FIGS. 2-4 the stationary guide 11 is defined by a plate shaped member positioned underneath the forward inner edge 6 of the roof opening 2 having a rounded edge 29 facing the roof opening for guiding the flexible member 8. The plate shaped member 11 may be shaped as water collecting gutter for collecting water entering part of the roof opening 2 when the movable panel 4 is in a position for (at least partially) opening the roof opening 2 and for discharging the water to a water discharge system having an outlet 30 (FIG. 4).

Figure 5:
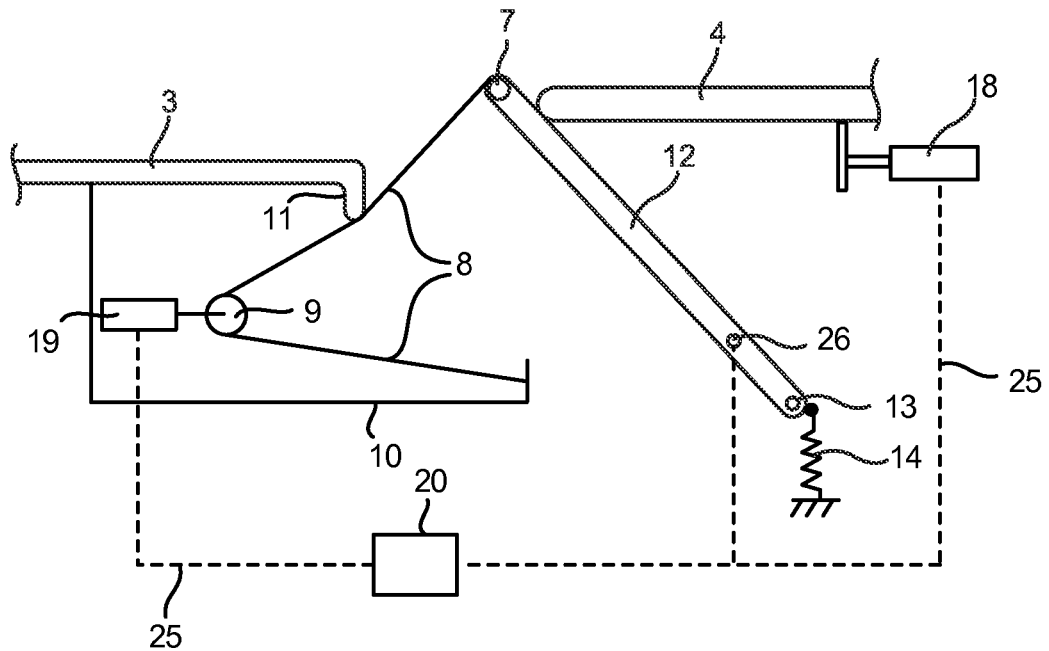
FIG. 5 shows an alternative embodiment for driving the guide rod.

Referring to FIG. 5, an embodiment is illustrated in which, again, the frame part 7 is carried by pivot arms 12 which are biased (spring 14) towards the extended position of the frame part. At least part of the momentary positions of the pivot arms 12 (and thus the frame part 7) are defined by an engagement with the movable panel 4 (as long as the movable panel 4 engages the pivot arms 12; when the pivot arms 12 have reached an extreme position—for example in a position corresponding with FIG. 3—a further movement of the movable panel 4 causes the movable panel 4 to disengage the pivot arms 12 which then will remain in said extreme position). This means that it is possible to define a relation between the position of the movable panel 4 and the position of the frame part 7.

A first drive mechanism 18 for the movable panel 4 is provided as well as a second drive mechanism 19 configured to drive the guide rod 9. Based upon the above relation between the position of the movable panel 4 and the position of the frame part 7 the first and second drive mechanisms 18 and 19 can be synchronized to keep the flexible member 18 in a taut state by adequately moving the guide rod 9. This may be carried out by a controller 20 operably connected to the drive mechanisms 18 and 19 through control lines 25.

In one embodiment, which should not be considered limiting, the drive mechanisms 18 and 19 (and other drive mechanisms discussed below) can include electric drive mechanisms, such as an electric motor connected to gears, pulleys or the like to cause generally linear movement of the guide rod 9. Controller 20 in one configuration synchronizes movement of the guide rod 9 and the panel 4 by sending a signal to the drive mechanisms, which may be electronic drive mechanisms controlled by a signal sent over control lines 25 in one embodiment.

Another, non-limiting example, for achieving such a synchronization is to sense the angle of the pivot arms 12 by a sensor 26, and to use the sensor signal therefrom and received by the controller 20 to control the second drive mechanism 19 that drives the guide rod 9. Yet another example uses a sensor (not shown) for sensing the position of the movable panel 4 (such as, for example a pulse counter or Hall sensor in the drive motor 18 of the movable panel 4) or a sensor for measuring the tension in the flexible member 8 directly (e.g. tension in a connection in the flexible member 8 to frame member 7 or to the stationary part 10, force against the guide 11 or against the roller 9) or indirectly (for example, tension in spring 14 or 17, or tension in the connection of roller 9 to shoe 16).

Figure 6:
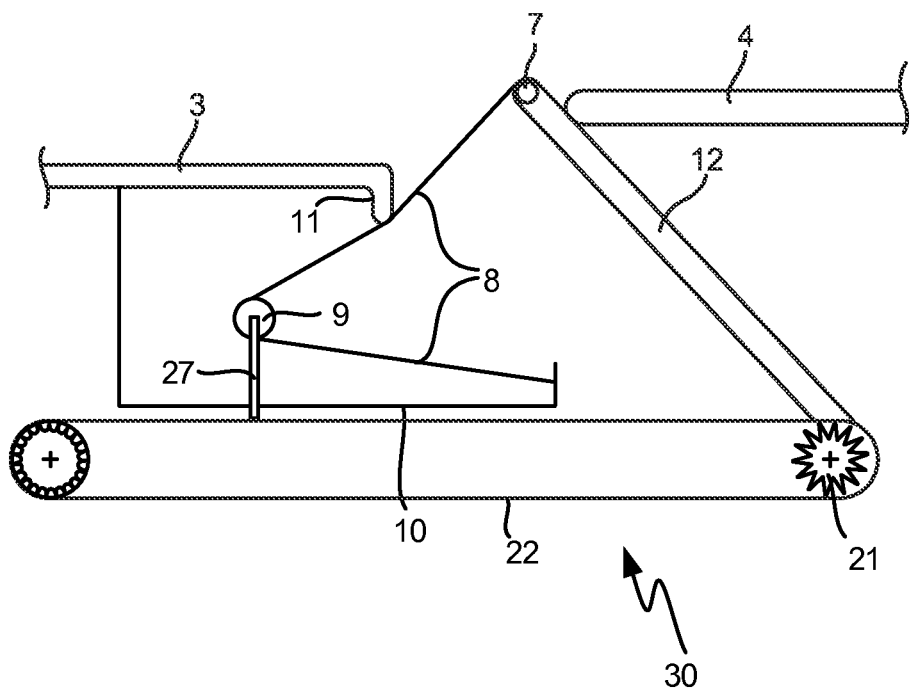
FIG. 6 shows yet another alternative embodiment for driving the guide rod.

Whereas FIG. 5 basically relies on electronic device for achieving the desired synchronization, FIG. 6 illustrates the principle of a mechanical synchronization. In the illustrated embodiment the pivot arms 12 couple to a second drive mechanism that comprises a mechanical drive mechanism 30 in one embodiment. The mechanical drive mechanism 30 includes in one embodiment gear wheels 21 driving a toothed belt 22. The toothed belt 22 is provided with a drive arm 27 engaging the guide rod 9. It follows that a rotation of the pivot arms 12 directly causes a movement of the guide rod 9. It is noted, that this only is a non-limiting example and that many other mechanical connections are conceivable within the scope of the present invention.

Figure 7:
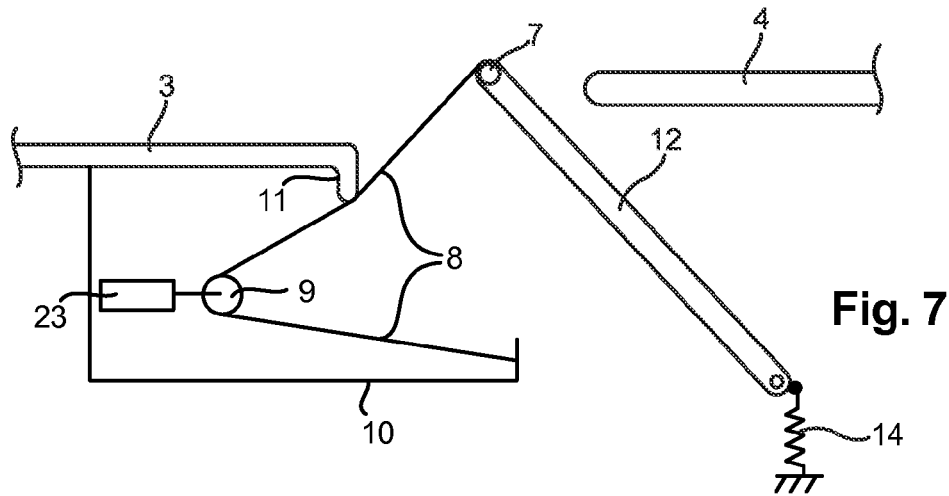
FIG. 7 shows still another embodiment for driving the guide rod.

Whereas in the embodiments according to FIGS. 5 and 6 the position of the guide rod 9 directly follows from the position of the movable panel 4 or from the position of the frame part 7 (or the pivot arms 12 thereof) by a mechanical or electronic coupling, FIG. 7 shows an embodiment in which the position of the guide rod 9 determines the position of the frame part 7. As illustrated, the frame part 7 of the wind deflector assembly 5 is biased by spring 14 towards its extended position and the guide rod 9 is provided with a drive mechanism 23 for defining its longitudinal position. Moving the guide rod 9 automatically leads to a corresponding movement of the frame part 7 while the flexible member 8 is maintained taut. In such a case the movable panel 4 does not directly determine the position of the frame part 7 (for example by engaging the pivot arms 12), but it still might be conceivable that the operation of the drive mechanism 23 depends from the position of the movable panel 4.

Figure 9:
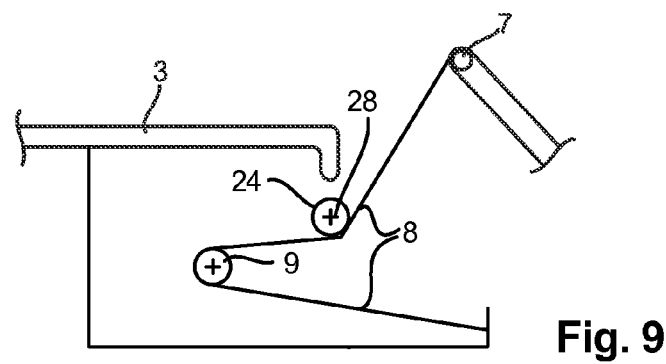
FIG. 9 shows an alternative stationary guide.

In the embodiments previously illustrated and described the stationary guide 11 is defined by a forward inner edge of the roof opening 2 (which may be part of or connected to a constructive member such as a forward transverse hollow beam 10 which also may house the guide rod 9) or by the plate shaped member. In FIG. 9 there is illustrated an alternative embodiment, in which the stationary guide 11 is defined by a rotatable guide roll 24 having a stationary axis of rotation 28. Of course it is conceivable too that the guide rod 9 also is defined by such a kind of rotatable guide roll.

Figure 10:
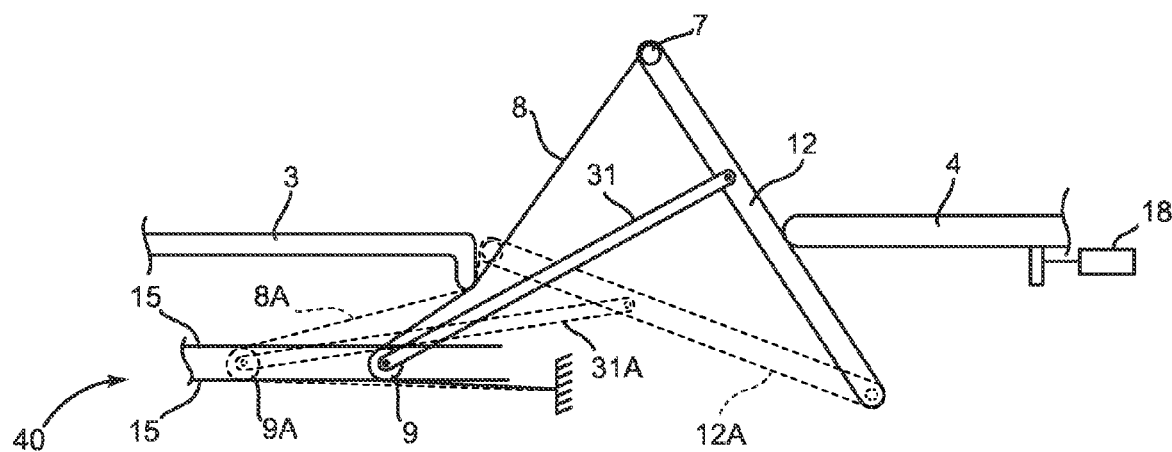
FIG. 10 shows another alternative embodiment for driving the guide rod.

Referring to FIG. 10, an embodiment is illustrated in which, similar to FIG. 4, ends of guide rod 9 move within two stationary guide channels 15 (only one of which is shown in FIG. 10). A link arm 31 is provided in this embodiment, and is configured to drive the guide rod 9. In one embodiment, the link arm 31 has a first end rotatably coupled to guide rod 9, and a second, opposite end rotatably coupled to pivot arm 12. Alternatively, the first end of link arm 31 may carry guide rod 9. As a result, a movement of the pivot arm 12 also will cause a movement of the guide rod 9, via the coupled link arm 31. Two positions of the guide arm. 9, pivot arm 12, link arm 31, and flexible member 8 are shown. Positions in solid lines and broken lines are shown, using the same reference numerals with an added "A" for the position of the broken line positions 8A, 9A, 12A, and 31A.

In this embodiment, a second drive mechanism 40 configured to drive guide rod 9 includes a link arm 31, and more specifically the end of link arm 31 coupled to guide rod 9 to drive guide rod 9. In this configuration, the link arm 31 synchronizes with the first drive mechanism 18.

Figure 11:
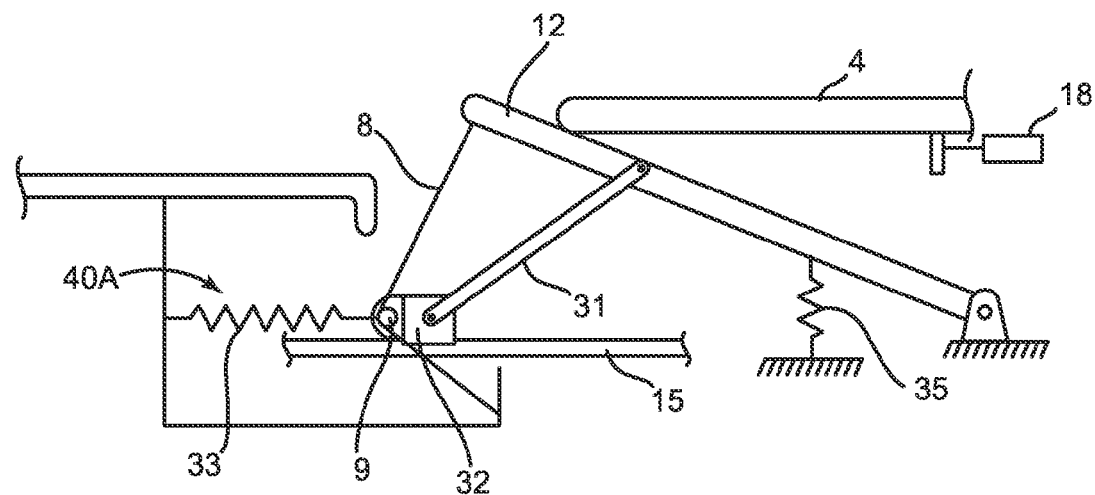
FIG. 11 shows another alternative embodiment for driving the guide rod.
Figure 12:
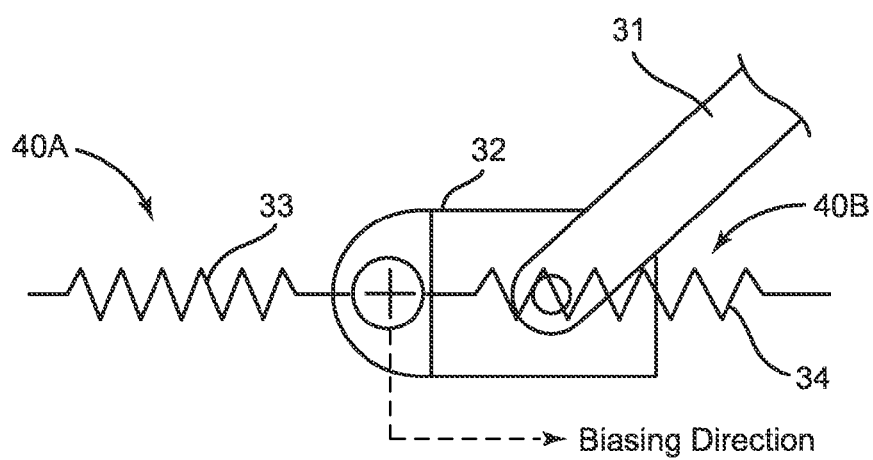
FIG. 12 shows detail of the slide block of FIG. 11.

Referring to FIG. 11, another alternative embodiment is shown. In FIG. 11, as a further component of second drive mechanism 40A the link arm 31 is rotatably coupled to a slide block 32, and the slide block 32 slides in one of the guide channels 15. Slide block 32 is coupled to guide rod 9. Slide block 32 is biased in a biasing direction toward a rear of the vehicle as is shown in greater detail in FIG. 12. Biasing of the slide block 32 may be accomplished using a push or compression spring 33 that acts as a part of a drive mechanism 40A. Alternatively, biasing of slide block 32 may be accomplished using a pull or tension spring 34 that acts as a part of a second drive mechanism 40B. Also, in one embodiment, a biasing spring 35 may be coupled to the pivot arm 12 to bias the pivot arm 12 toward a closed position with a pull or tension spring, or toward an open position with a push or compression spring. As the slide block 32 is driven, the guide rod 9 and link arm 31 are also driven.

Therefore, the pivot arm 12 through spring 35 and/or the slide block 32 through spring 33 or spring 34 is biased toward a position in which the pivot arm 12 is extended and engages the panel 4. Moving the panel 4 to an open position allows the pivot arm 12 to move to its extended position. The link arm 31 synchronizes the movements of the slide block 32 and thus the guide rod 9 and the movement of the pivot arm 12. An additional slide block 32 (not shown) may be used at the other of the two guide channels. Springs 33, 34, and 35 are couplable to a stationary part of the vehicle in some embodiments.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle, comprising a roof opening provided in a stationary roof part, a movable panel configured to open and close said roof opening and a wind deflector assembly positioned near a forward edge of the roof opening, which wind deflector assembly comprises a frame part extending substantially in a transverse direction and movable between a retracted position below the level of the stationary roof part and an extended position above said level of the stationary roof part and a flexible member which with a first end is attached to said frame part and which with an opposite second end is attached to a stationary part of the vehicle, a guide rod for the flexible member extending in a transverse direction and movable in a longitudinal direction of the vehicle, wherein the flexible member, starting from its second end, successively extends in a first sense substantially along said longitudinal direction towards the guide rod, partially around said guide rod and in an opposite sense substantially along said longitudinal direction, past a stationary guide therefor and from there extends towards the frame part, and wherein the guide rod is configured to move in such a manner that the flexible member is maintained in a taut state in all positions of the frame part.

2. The open roof construction according to claim 1, wherein said first sense corresponds with a forward direction with respect to the vehicle.

3. The open roof construction according to claim 1, wherein the frame part of the wind deflector assembly is biased towards its extended position and at least part of its momentary positions are defined by an engagement with the movable panel, wherein further a first drive mechanism is operably coupled to move the movable panel and a second drive mechanism is operably coupled to determine a longitudinal position of the guide rod, wherein the first and second drive mechanism are synchronized to keep the flexible member in a taut state, and wherein the synchronization between the first and second drive mechanism is obtained through mechanical and/or electronic devices.

4. The open roof construction according to claim 1, wherein the guide rod is biased in said first sense substantially along the longitudinal direction, and wherein the guide rod is engaged by a spring extending between said guide rod and a stationary part of the vehicle.

5. The open roof construction according to claim 1, wherein the guide rod comprises two opposite ends which are guided in two corresponding stationary guide channels each extending substantially in the longitudinal direction.

6. A wind deflector assembly for an open roof construction of a vehicle having a roof opening, the wind deflector assembly comprising:
   a frame part movable between a retracted position and an extended position above the retracted position;
   a flexible member having a first end attached to said frame part and an opposite second end configured to be attached to a stationary part of the vehicle;
   a guide rod configured to engage the flexible member, the guide rod extending in a first direction substantially parallel to the frame part and configured to move in a second direction transverse to the first direction;
   wherein the flexible member, starting from its second end, successively extends in a first sense in the second direction towards the guide rod, partially around said guide rod and in an opposite sense away from the guide rod and towards the frame part, and wherein the guide rod is movable in such a manner that the flexible member is maintained in a taut state in from the retracted position to the extended position of the frame part.

7. The wind deflector assembly according to claim 6, wherein the frame part of the wind deflector assembly is biased towards the extended position and further comprising a drive mechanism coupled to the guide rod to determine a position of the guide rod in the second direction.

8. The wind deflector assembly according to claim 6, wherein the guide rod is biased in said first sense, wherein the guide rod is engaged by a spring, and wherein the guide rod comprises two opposite ends which are guided in two spaced apart guide channels each extending in the second direction.

9. The wind deflector assembly according to claim 6, wherein the guide rod comprises a rotatable guide roll.

10. A method of positioning a wind deflector with respect to a roof opening in a fixed roof of a vehicle, the vehicle having a movable panel for opening and closing the roof opening and the wind deflector having a frame part extending substantially in a transverse direction with respect to a longitudinal direction of the vehicle and movable from a retracted position below the fixed roof to an extended position above the fixed roof, and a flexible member having a first end attached to said frame part and which with an opposite second end attached to a stationary part of the vehicle, a guide rod configured to engage the flexible member extending in the transverse direction and movable in the vehicle in a longitudinal direction of the vehicle, wherein the guide rod contacts the flexible member to maintain it taut in at least intermediate positions between the retracted position and the extended position, the method comprising:
   moving the frame part from a retracted position below the fixed roof to an extended position of the fixed roof; and
   moving the guide rod in such a manner that the flexible member is maintained in a taut state in intermediate positions from the retracted position to the extended position and wherein at least a portion of the flexible member from the guide rod to the frame part extends at an oblique angle with respect to the longitudinal direction for at least some positions of the guide rod, and wherein the flexible member, starting from its second end, successively extends in a first sense substantially along said longitudinal direction towards the guide rod, partially around said guide rod and in an opposite sense substantially along said longitudinal direction, past a stationary guide therefor and from there extends towards the frame part.

11. The open roof construction according to claim 1, wherein the stationary guide is defined by a rotatable guide roll having a stationary axis of rotation.

12. The open roof construction according to claim 1, wherein the stationary guide is defined by a plate shaped member positioned underneath a forward inner edge of the roof opening having a rounded edge facing the roof opening for guiding the flexible member, and wherein the plate shaped member is shaped as water collecting gutter configured to collect water entering the roof opening when the movable panel is in a position for opening the roof opening.

13. The open roof construction according to claim 1, wherein the guide rod comprises a rotatable guide roll.

14. The open roof construction according to claim 1, and further comprising:
   two corresponding stationary guide channels each extending in the longitudinal direction, wherein the guide rod comprises two opposite ends which are guided in the two corresponding stationary guide channels; and
   a link arm configured to drive the guide rod within the stationary guide channels.

15. The open roof construction according to claim 14, and further comprising a slide block for an end of the guide rod, the slide block guiding the end of the guide rod in a one of the two corresponding stationary guide channels, the link arm rotatably coupled to the slide block.

16. The open roof construction according to claim 14, and further comprising a first drive mechanism for the movable panel and a second drive mechanism for the guide rod for determining its longitudinal position, wherein the first and second drive mechanism are synchronised to keep the flexible member in a taut state, wherein the second drive mechanism is coupled to control movement of the link arm.

17. The open roof construction according to claim 14, and further comprising a pivot arm rotatably coupled between the frame part and the vehicle, and wherein the link arm is rotatably coupled between the guide rod and the pivot arm.

18. The wind deflector assembly according to claim 1, wherein the frame part of the wind deflector assembly is biased towards the extended position and wherein a drive mechanism is coupled to the guide rod to determine a longitudinal position of the guide rod, and further comprising:
   two corresponding stationary guide channels each extending in the longitudinal direction, wherein the guide rod comprises two opposite ends which are guided in the two corresponding stationary guide channels; and
   a link arm configured to move the guide rod within the stationary guide channels.

19. The wind deflector assembly according to claim 18, and further comprising a slide block at an end of the guide rod, the slide block guiding the end of the guide rod in a one of the two corresponding stationary guide channels, the link arm rotatably coupled to the slide block.

20. The wind deflector assembly according to claim 18, and further comprising a drive mechanism for the guide rod for determining its position in the second direction.

21. The wind deflector assembly according to claim 20, wherein the drive mechanism is coupled to control movement of the link arm.

22. The wind deflector assembly according to claim 18, and further comprising a pivot arm rotatably coupled to the frame part and couplable to the vehicle, wherein the link arm is rotatably coupled between the guide rod and the pivot arm.

23. The wind deflector assembly according to claim 21, wherein the drive mechanism comprises a push spring coupled to the slide block and couplable to the vehicle to bias the guide rod toward the frame part.

24. The wind deflector assembly according to claim 22, wherein the drive mechanism comprises a pull spring coupled to the slide block and couplable to the vehicle to bias the guide rod toward the frame part.

25. The wind deflector assembly according to claim 18, and further comprising:
   a pivot arm rotatably coupled to the frame part and rotatably couplable to the vehicle, wherein the link arm is rotatably coupled between the guide rod and the pivot arm; and
   a biasing spring coupled to the link arm to bias the pivot arm toward a closed position.

* * * * *